A. HAYES.
PICTURE HOLDER.
APPLICATION FILED DEC. 22, 1914. RENEWED MAR. 22, 1916.
1,210,934.
Patented Jan. 2, 1917.
2 SHEETS—SHEET 1.
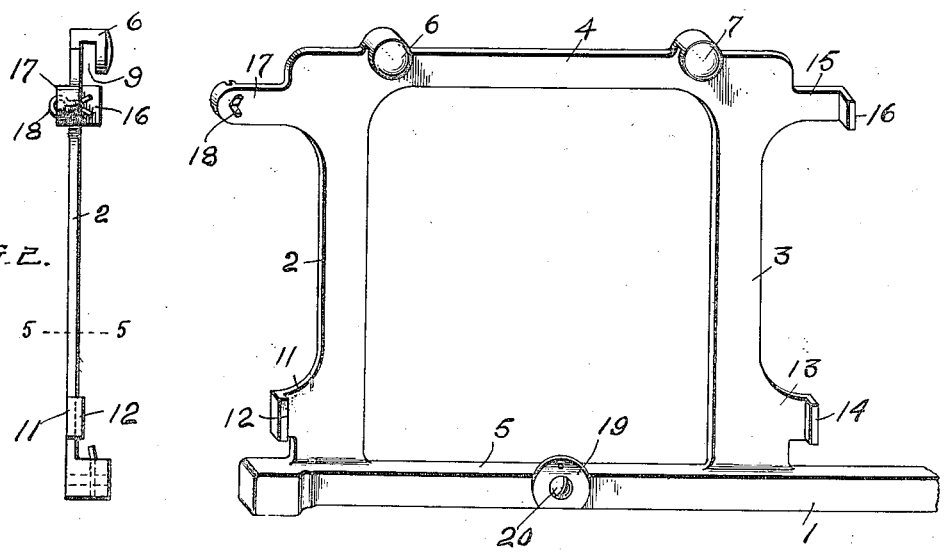
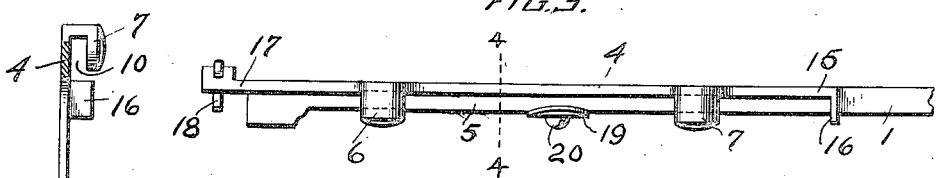
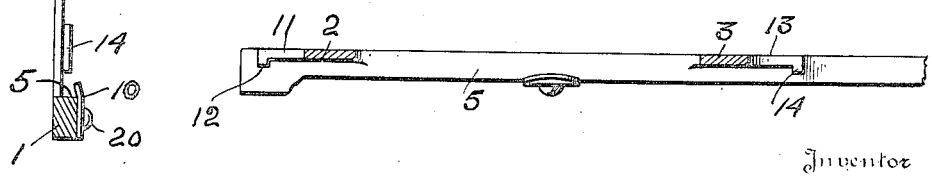
Witnesses
W. C. Fielding
Lionel R. Fiedler
Inventor
Albert Hayes,
By Gurley & Doyle.
Attorney A. HAYES.
PICTURE HOLDER.
APPLICATION FILED DEC. 22, 1914. RENEWED MAR. 22, 1916.
1,210,934.
Patented Jan. 2, 1917.
2 SHEETS—SHEET 2.
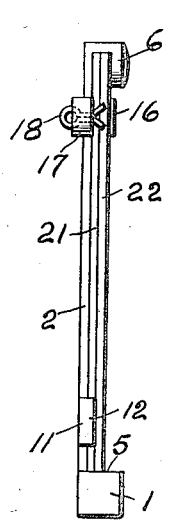
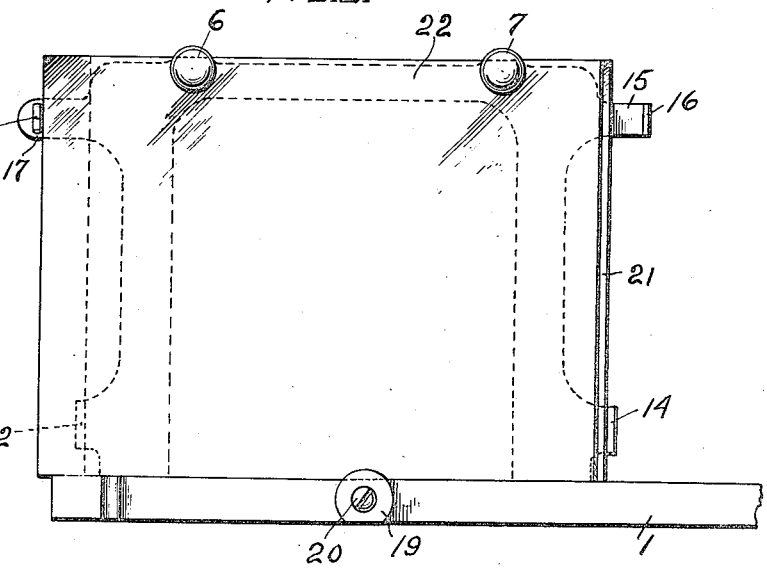
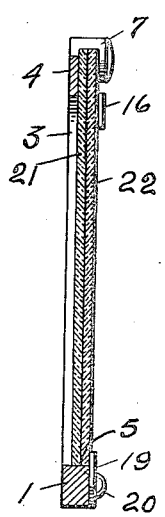
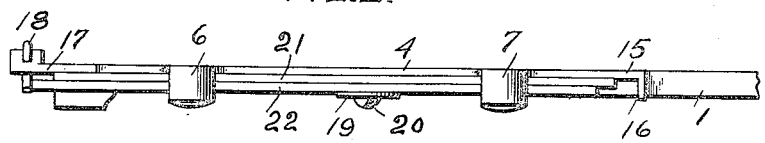
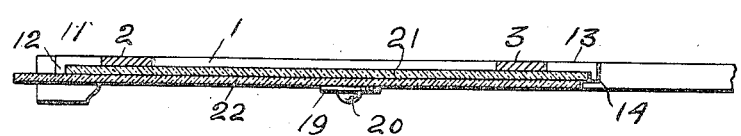
Inventor
Albert Hayes
By Greeley & Doyle
Attorney
Witnesses
W. C. Fielding
Lionel R. Fiedler

UNITED STATES PATENT OFFICE.

ALBERT HAYES, OF SALT LAKE CITY, UTAH, ASSIGNOR TO MOVING ADVERTISEMENT COMPANY, A CORPORATION OF ARIZONA.

PICTURE-HOLDER.

1,210,934.   Specification of Letters Patent.   Patented Jan. 2, 1917.

Application filed December 22, 1914, Serial No. 878,468. Renewed March 22, 1916. Serial No. 85,973.

*To all whom it may concern:*

Be it known that I, ALBERT HAYES, a citizen of the United States, residing at Salt Lake City, in the county of Salt Lake, State of Utah, have invented certain new and useful Improvements in Picture-Holders, of which the following is a description, reference being had to the accompanying drawings, forming a part hereof.

My invention relates to devices for holding picture cards, plates and the like for exhibiting purposes and has for its object to provide a device of this character particularly adapted for holding two plates, one or both of which may be transparent so that one of them may be shifted or moved relative to the other, which shall be so arranged that the plates may be readily removed to permit others to be substituted, which will be adapted for use in automatically operated exhibiting machines, and which will be simple, strong and inexpensive in construction and will not be liable to get out of order and will be adapted to be made in one piece.

With these and other objects hereinafter explained in view, my invention consists in the construction and combination of elements hereinafter described and claimed.

In the drawings, Figure 1 is a front elevation of a slide holder embodying my invention. Fig. 2 is an end view of the same taken from the outer end. Fig. 3 is a top edge view of the same. Fig. 4 is a vertical sectional view on line 4—4, of Fig. 3. Fig. 5 is a horizontal sectional view on line 5—5, of Fig. 2. Fig. 6 is a view similar to Fig. 1 but showing two plates in the holder. Figs. 7, 8, 9 and 10 are views similar to Figs. 2, 3, 4 and 5, but showing two plates in the holder.

In the holder as shown, 1 indicates a bar here shown as horizontal having two uprights 2 and 3 extending upward from it, the upper ends of these uprights being joined by an upper bar 4 parallel with the bar 1. The upright bars 2 and 3 and the upper bar 4 are of less thickness than the bar 1 and are preferably of greater breadth. Their rear faces are preferably in the same plane with the rear face of bar 1 and their front faces are considerably to the rear of the front face of bar 1 so as to leave on the upper edge of bar 1 a ledge 5 to serve as the support for the plate or picture.

On the upper bar 4 are arranged lugs 6 and 7 which extend forward a sufficient distance to have formed in their sides toward the bar 1, recesses 9 and 10 to receive the upper edges of the plates to be carried by the holder, the lower edges of the plates resting on the ledge 5 of the bar 1.

The upright 2 is provided on its left hand or outer edge near the bar 1 with an extension 11 having at its outer end a lug 12 extending forward a distance corresponding to the thickness or only slightly greater than the thickness of one of the plates to be held in the holder. The upright 3 is provided on its right hand or outer edge near the bar 1 with an extension 13 having at its outer end a lug 14 corresponding to lug 12 on the extension 11 and extending forward the same distance. Upright 3 is also provided near its upper end on its right hand edge with an extension 15 having at its outer end a lug 16 extending forward a distance greater than the combined thickness of the two plates to be held in the holder. Upright 2 is provided near its upper end on its left hand or outer edge with an extension 17, the front face of which is in the same plane with the front face of the uprights. Near its outer end, this extension 17 is provided with a perforation to receive a removable pin 18.

On its front edge, the bar 1 is provided with a removable plate 19 held in place by screw 20 and extending above the plane of the ledge 5 to bear against the front lower edge of the outer one of the plates held in the holder so as to retain them in place.

The holder is particularly intended for holding plates of glass or the like, such for instance as are described in United States patent to A. Spiegel, No. 1,066,765, issued July 8, 1913, one of which carries two or more pictures printed on alternate lines and the other of which carries lines adapted to conceal one or more of the pictures and to permit one of the pictures to be seen through the clear spaces between the lines and by being moved to permit one after another of the separate pictures to be brought into view.

The space between the lugs 12 and 14 corresponds to the length of the picture carrying plate, and when the picture carrying plate 21 is in place, its lower edge will rest in the ledge 5, its upper edge will be in the recesses 9 and 10 and its side edges will be against or nearly against the lugs 12 and 14, respectively, and will thus be held against vertical or lateral movement.

In order to place the plates in the holder, the spring pin 18 should be drawn back or taken out so that the front face of the extension 17 will not be obstructed. When the picture plate 21 has been placed in position, the line or screen plate 22 may be slipped in. This line or screen plate is preferably of greater length than the picture plate. When in place, the line or screen plate has its lower edge on the ledge 5 and its upper edge in the recesses 9 and 10, being held on ledge 5 by the removable plate 19. The line or screen plate is prevented from sliding out of the holder in one direction by the lug 16 and, the spring pin 18 being restored to position, is prevented from being slid out in the other direction by this spring pin. The distance between the lug 16 and the spring pin 18 relative to the length of the line or screen plate is such that the line or screen plate may be moved over the face of the picture plate to cause the several pictures to be brought successively into view.

The lugs 12 and 14 may, if desired, be made of such length as to hold the line or screen plate away from the picture plate sufficiently to prevent rubbing. Of course, the screen plate may be the shorter plate and may be held stationary between lugs 12 and 14 and the picture plate may be the longer plate and may be moved relative to the screen plate.

The bar 1 may be extended to the right, as shown, to form a handle for handling the plates by hand or by the mechanism of an exhibiting machine. The holder may, if desired, be used for holding a single plate of the length of the screen or line plate, the plate in such case resting against the front ends of the lugs 12 and 14. The plate holder may be used to hold pictures on opaque material such as cards, but is particularly adapted and intended for holding plates of transparent material to be viewed by transmitted light. The holder may be cast in one piece so as to require very little machine work to finish it ready for use. The movable plate may be moved over the face of the stationary plate by hand or by mechanical means.

Having thus described my invention, what I claim is:—

1. A device for holding picture plates, cards and the like, comprising a bar adapted to support the lower edge of the picture plate, uprights carried by the bar of less thickness than the bar, lugs carried by the uprights recessed to receive the upper edge of the picture plate, side lugs carried by the uprights to engage the side edges of the picture plate and means for retaining the picture plate on the bar.

2. A device for holding picture plates, cards and the like, comprising a bar adapted to support the lower edge of the picture plate, uprights carried by the bar of less thickness than the bar, lugs carried by the uprights recessed to receive the upper edge of the picture plate, side lugs carried by the uprights to engage the side edges of the picture plate and means for retaining the picture plate on the bar, said bar, uprights and lugs being formed in one piece.

3. A device for holding picture plates, cards and the like, comprising a bar adapted to support the lower edge of the picture plate having its upper face of sufficient breadth to receive two picture plates, uprights carried by the bar of less thickness than the bar, lugs carried by the uprights recessed to receive the upper edges of the two picture plates, side lugs carried by the uprights to engage the side edges of one of the picture plates, means carried by the uprights for limiting the movement of the other picture plate, and means for retaining the picture plates on the bar.

4. A device for holding picture plates, cards and the like, comprising a bar adapted to support the lower edge of the picture plate having its upper face of sufficient breadth to receive two picture plates, uprights carried by the bar of less thickness than the bar, lugs carried by the uprights recessed to receive the upper edges of the two picture plates, side lugs carried by the uprights to engage the side edges of one of the picture plates, said side lugs extending forward a distance not exceeding the thickness of the picture plate engaged by them, means carried by the uprights for limiting the movement of the other picture plate, said means extending forward a distance greater than the forward extent of the said side lugs, and means for retaining the picture plates on the bar.

5. A device for holding picture plates, cards and the like, comprising a bar adapted to support the lower edge of the picture plate having its upper face of sufficient breadth to receive two picture plates, uprights carried by the bar of less thickness than the bar, lugs carried by the uprights recessed to receive the upper edges of the two picture plates, side lugs carried by the uprights to engage the side edges of one of the picture plates, said side lugs extending forward a distance not exceeding the thickness of the picture plate engaged by them, means carried by the uprights for limiting the movement of the other picture plate, said means comprising a fixed lug carried by one upright and a removable projection carried by the upright, and means for retaining the picture plates on the bar.

This specification signed and witnessed this 22nd day of December, A. D. 1914.

ALBERT HAYES.

In the presence of—
W. C. FIELDING,
M. ROBSON.